US012573543B2

(12) United States Patent
Li et al.

(10) Patent No.: US 12,573,543 B2
(45) Date of Patent: Mar. 10, 2026

(54) MAGNETIC INTEGRATED DEVICE

(71) Applicant: Lite-On Electronics (Guangzhou) Limited, Guangzhou City (CN)

(72) Inventors: Yan Li, Guangzhou City (CN); Renjun Dong, Guangzhou City (CN); Jingyang Hou, Guangzhou City (CN)

(73) Assignee: Lite-On Electronics (Guangzhou) Limited, Guangzhou City (CN)

( * ) Notice: Subject to any disclaimer, the term of this patent is extended or adjusted under 35 U.S.C. 154(b) by 901 days.

(21) Appl. No.: 17/870,867

(22) Filed: Jul. 22, 2022

(65) Prior Publication Data

US 2023/0360844 A1 Nov. 9, 2023

(30) Foreign Application Priority Data

May 5, 2022 (CN) ........................ 202210480579.0

(51) Int. Cl.
*H01F 27/28* (2006.01)
*H01F 27/24* (2006.01)
*H01F 27/29* (2006.01)
*H01F 27/30* (2006.01)

(52) U.S. Cl.
CPC ........... *H01F 27/306* (2013.01); *H01F 27/24* (2013.01); *H01F 27/29* (2013.01)

(58) Field of Classification Search
CPC ........ H01F 27/306; H01F 27/24; H01F 27/29; H01F 2027/065; H01F 5/04; H01F 27/06; H01F 30/10; H01F 30/12; H01F 27/2866; H01F 2003/103; H01F 2005/043; H01F 2027/348; H01F 27/40; H01F 3/14; H02M 3/24
USPC ........................................... 336/221, 83, 170
See application file for complete search history.

(56) References Cited

U.S. PATENT DOCUMENTS 7,598,839 B1 * 10/2009 Wedley .................. H01F 27/30 336/212
2009/0267719 A1 * 10/2009 Tseng .................... H01F 17/043 336/83
2009/0289751 A1 * 11/2009 Nagano ............... H02M 3/1584 336/221
2012/0062349 A1 * 3/2012 Nagano .................. H01F 30/10 336/212
2017/0367184 A1 * 12/2017 Wang ...................... H01F 27/28
2021/0305906 A1 * 9/2021 Jin ........................ H02M 7/003

* cited by examiner

*Primary Examiner* — Tszfung J Chan
*Assistant Examiner* — Kazi S Hossain

(57) ABSTRACT

Disclosed is a magnetic integrated device including a first magnetic core plate and N magnetic elements, one of which is connected to the first magnetic core plate. Excitation currents of the N magnetic elements have phases different from each other by 360/N degrees, and excitation directions of adjacent magnetic elements are opposite, wherein N is an integer greater than or equal to 2. Each magnetic element includes a first magnetic core including a first magnetic core body, a first magnetic column and two first side columns fixed on the same side of the first magnetic core body, and a combined winding including a secondary winding and a primary winding which are wound around the first magnetic column, wherein a extension direction of the first magnetic column is towards the first magnetic core plate. Therefore, the cost, power consumption and space volume are reduced, and the power density is improved.

13 Claims, 13 Drawing Sheets

200

MAGNETIC INTEGRATED DEVICE

CROSS REFERENCE TO RELATED APPLICATION

This application claims the priority benefit of Chinese Patent Application Serial Number 202210480579.0, filed on May 5, 2022, the full disclosure of which is incorporated herein by reference.

BACKGROUND

Technical Field

The present disclosure relates to the technical field of electronic products, and in particular, to a magnetic integrated device.

Related Art

The LLC topology is suitable for a switching power supply with high power, high efficiency and high power density since the LLC topology has a simple structure and achieves soft switching easily.

With the improvement of power and power density of the switching power supply, it is generally necessary to connect each phase of the multi-phase LLC conversion circuit in interleaved parallel to reduce the number of output capacitors and improve heat distribution. However, when each phase of the multi-phase LLC conversion circuit is in interleaved parallel, the number of magnetic components, such as transformers and resonant inductors, increases, and the existing multi-phase LLC conversion circuit is assembled in parallel by the magnetic components processed independently of each other. Therefore, there is a problem that the volume is large and the configuration space of the circuit board needs to be increased, which is not conducive to the miniaturization of the switching power supply.

In addition, the multi-phase LLC conversion circuit constructed by assembling magnetic elements processed independently of each other in parallel has a problem that it is difficult to reduce core loss because each phase of the multi-phase LLC conversion circuit operates independently.

SUMMARY

The present disclosure provides a magnetic integrated device, which can solve the problems in the prior art that the volume is large and it is difficult to reduce core loss because each phase of the multi-phase LLC conversion circuit operates independently.

In order to solve the above technical problem, the present disclosure is implemented as follows.

The present disclosure provides a magnetic integrated device, which comprises a first magnetic core plate and N magnetic elements. The N magnetic elements are arranged in sequence in the same direction, and one of the N magnetic elements is connected to the first magnetic core plate. Excitation currents of the N magnetic elements have phases different from each other by $$\frac{360}{N}$$

degrees, and excitation directions of adjacent magnetic elements among the N magnetic elements are opposite, wherein N is an integer greater than or equal to 2. Each magnetic element comprises a first magnetic core and a combined winding, wherein the first magnetic core comprises a first magnetic core body, a first magnetic column and two first side columns, wherein the first magnetic column and the two first side columns are fixed on the same side of the first magnetic core body, the two first side columns are disposed at opposite sides of the first magnetic core body, an outer wall of the first magnetic column and inner walls of the two first side columns form a first accommodating slot, and an extension direction of the first magnetic column is towards the first magnetic column; the combined winding comprises a secondary winding and a primary winding, and the secondary winding and the primary winding are disposed in the first accommodating slot and wound around the first magnetic column.

In the embodiments of the present disclosure, the first magnetic core plate and the N magnetic elements can be integrated into an N-phase integrated transformer, which reduces the volume of the N-phase integrated transformer and reduces the manufacturing cost of the N-phase integrated transformer. When the N-phase integrated transformer is applied to an N-phase LLC conversion circuit, the power density of the N-phase LLC conversion circuit can be improved, and the configuration space of the N-phase LLC conversion circuit on the circuit board can be reduced. In addition, since the excitation currents of the N magnetic elements have phases different from each other by $$\frac{360}{N}$$

degrees, and the excitation directions of adjacent magnetic elements among the N magnetic elements are opposite, the effect of magnetic cancellation can be achieved, the power loss of the first magnetic core can be reduced, and the efficiency of the N-phase LLC conversion circuit can be improved when the N-phase integrated transformer is applied to the N-phase LLC conversion circuit.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
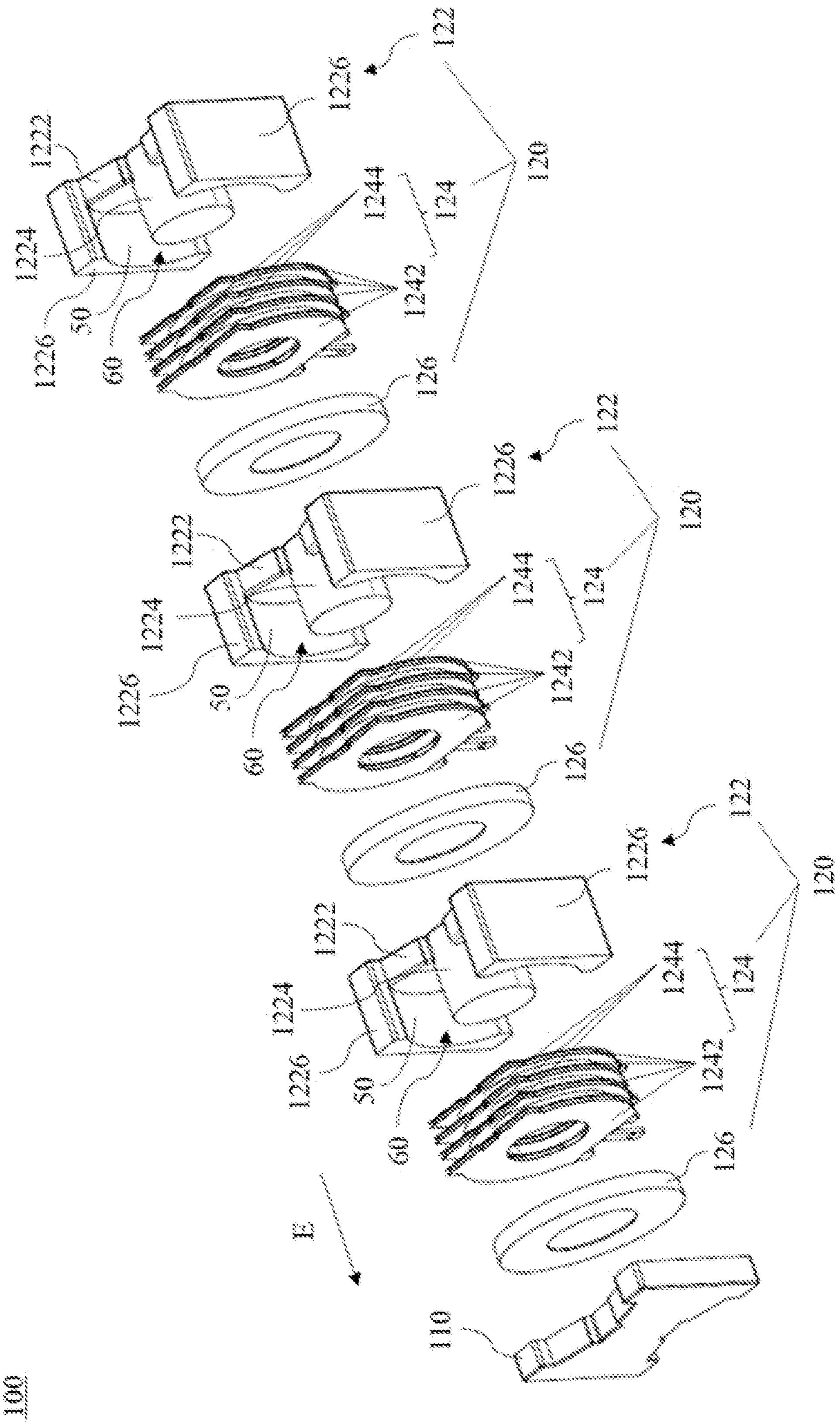
FIG. 1 is an exploded schematic diagram of a magnetic integrated device according to an embodiment of the present disclosure.

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to".

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

It must be understood that when a component is described as being "connected" or "coupled" to (or with) another component, it may be directly connected or coupled to other components or through an intermediate component. In contrast, when a component is described as being "directly connected" or "directly coupled" to (or with) another component, there are no intermediate components. In addition, unless specifically stated in the specification, any term in the singular case also comprises the meaning of the plural case.

In the following embodiment, the same reference numerals are used to refer to the same or similar elements throughout the disclosure.

Figure 2:
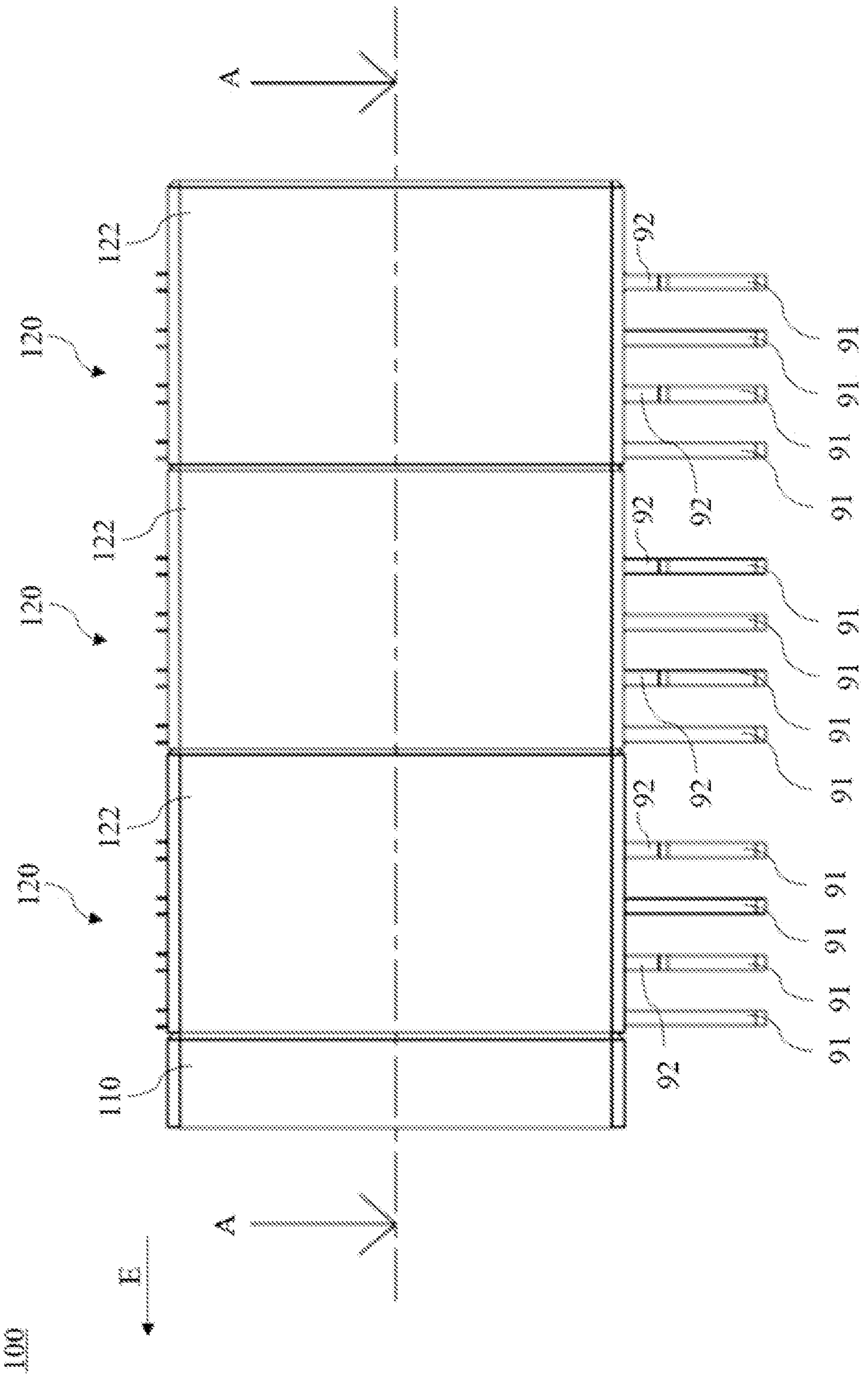
FIG. 2 is a combination diagram of the magnetic integrated device of FIG. 1.
Figure 3:
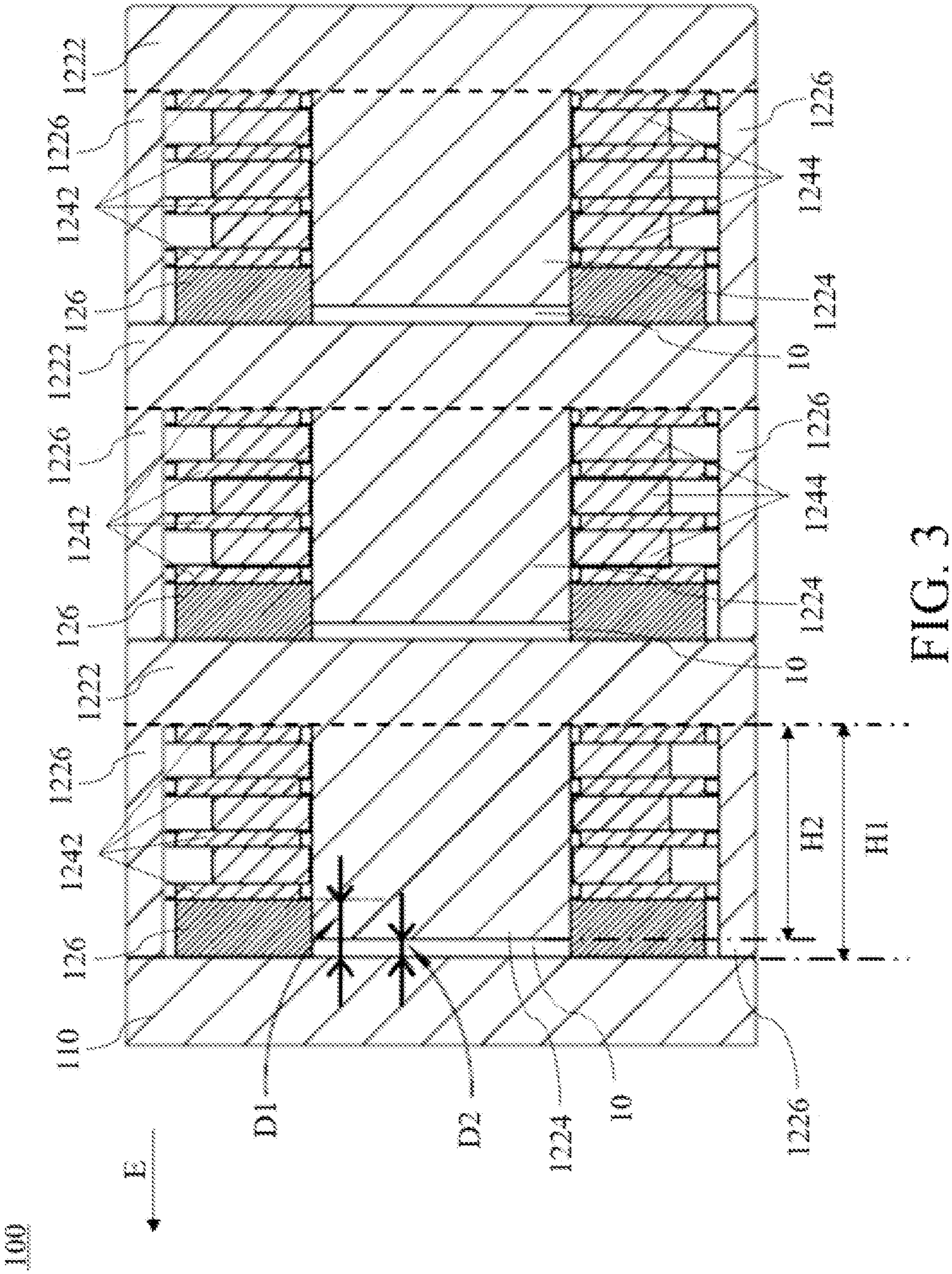
FIG. 3 is a cross-sectional diagram of the magnetic integrated device of FIG. 2 along line AA.

Please refer to FIG. 1 to FIG. 3, wherein FIG. 1 is an exploded schematic diagram of a magnetic integrated device according to an embodiment of the present disclosure, FIG. 2 is a combination diagram of the magnetic integrated device of FIG. 1, and FIG. 3 is a cross-sectional diagram of the magnetic integrated device of FIG. 2 along line AA. As shown in FIG. 1 to FIG. 3, a magnetic integrated device 100 comprises a first magnetic core plate 110 and N magnetic elements 120, the N magnetic elements 120 are arranged in sequence in the same direction, wherein one of the N magnetic elements 120 (i.e., the leftmost magnetic element 120 in the drawings of FIG. 1 to FIG. 3) is connected to the first magnetic core plate 110, and N is an integer greater than or equal to 2. In this embodiment, N is equal to 3, and the first magnetic core plate 110 and the three magnetic elements 120 can be integrated into a three-phase integrated transformer, but this embodiment is not intended to limit the present disclosure.

Figure 4:
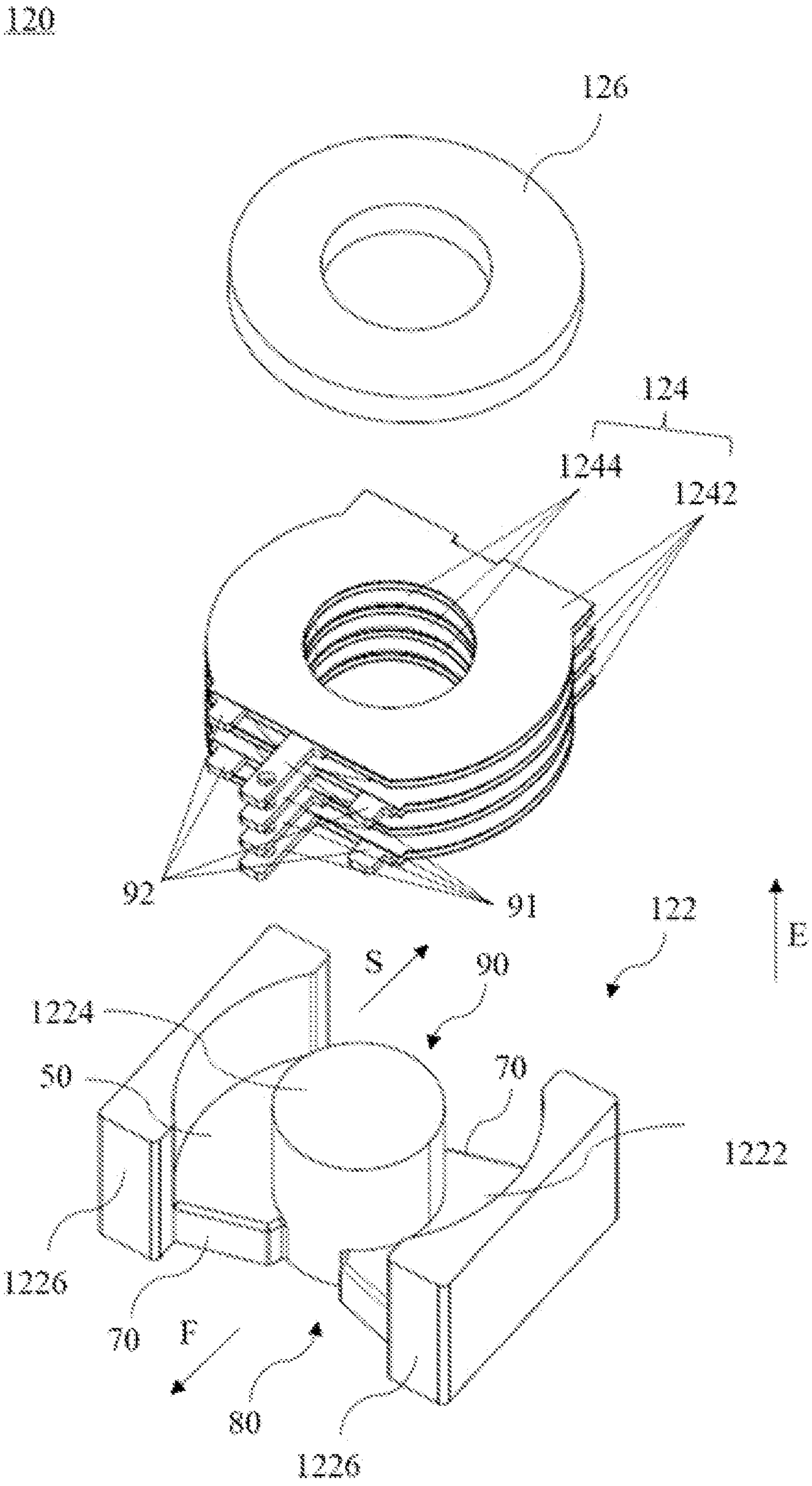
FIG. 4 is the exploded schematic diagram of a magnetic element in the magnetic integrated device of FIG. 1.

Please refer to FIG. 4, which is the exploded schematic diagram of a magnetic element in the magnetic integrated device of FIG. 1. As shown in FIG. 4, the magnetic element 120 comprises a first magnetic core 122 and a combined winding 124, the first magnetic core 122 comprises a first magnetic core body 1222, a first magnetic column 1224, and two first side columns 1226, and the first magnetic column 1224 and the two first side columns 1226 are fixed on the same side of the first magnetic core body 1222, wherein the two first side columns 1226 are disposed at opposite sides of the first magnetic core body 1222, and the outer wall of the first magnetic column 1224 and the inner walls of the two first side columns 1226 forms a first accommodating slot 50, an extension direction E of the first magnetic column 1224 is towards the first magnetic core plate 110, as shown in FIG. 1 and FIG. 3; the combined winding 124 comprises a secondary winding 1242 and a primary winding 1244, and the secondary winding 1242 and the primary winding 1244 are disposed in the first accommodating slot 50 and wound around the first magnetic column 1224, as shown in FIG. 3.

In addition, the first magnetic core 122 is provided with a magnetic core opening 60 facing the extension direction E, and the height H1 of each of the two first side columns 1226 along the extension direction E is greater than the height H2 of the first magnetic column 1224 along the extension direction E. Therefore, when the three magnetic elements 120 are arranged in sequence in the same direction, the magnetic core openings 60 of the three magnetic elements 120 face the same direction, the leftmost magnetic element 120 is connected to the first magnetic core plate 110 through the two first side columns 1226 thereof, and each of other magnetic elements 120 (i.e., the magnetic element 120 in the middle position and the magnetic element 120 on the far right) is connected to the first magnetic core body 1222 of the adjacent magnetic element 120 through two first side columns 1226 thereof, as shown in FIG. 3.

Moreover, the shape of the first magnetic core plate 110 may correspond to the shape of the first magnetic core body 1222; that is, the difference between the first magnetic core plate 110 and the first magnetic core 122 may be that the first magnetic core plate 110 does not have the first magnetic column 1224 and the two first side columns 1226.

Figure 5:
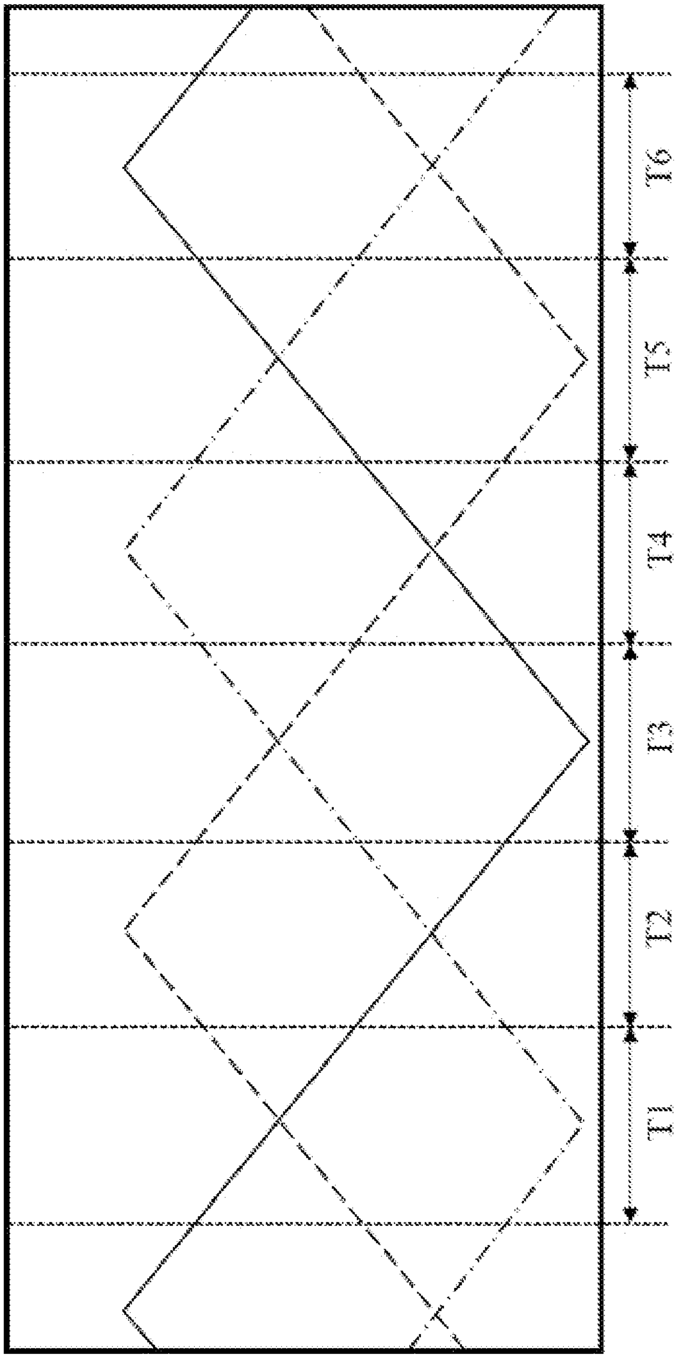
FIG. 5 is a waveform diagram of excitation currents of the three magnetic elements of FIG. 1 according to an embodiment.
Figure 6:
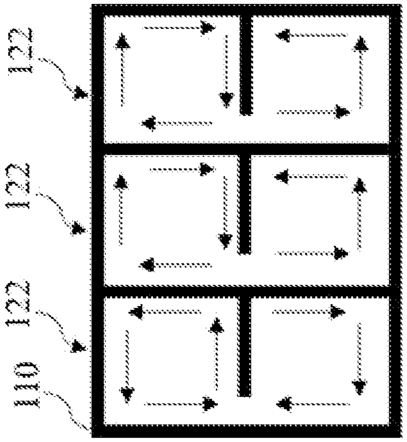
FIG. 6 to FIG. 11 are schematic diagrams of magnetomotive force distributions of the three magnetic elements of FIG. 1 in the first time period to the sixth time period of FIG. 5, respectively.
Figure 7:
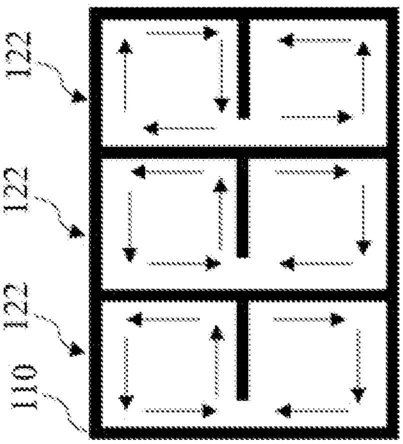
Figure 8:
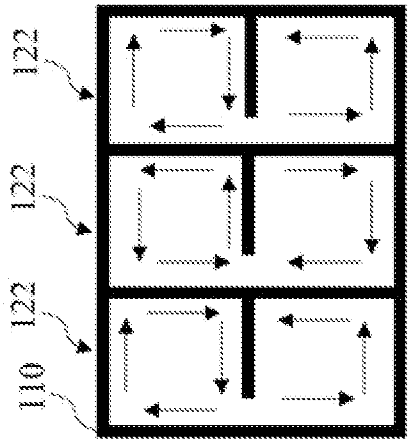
Figure 9:
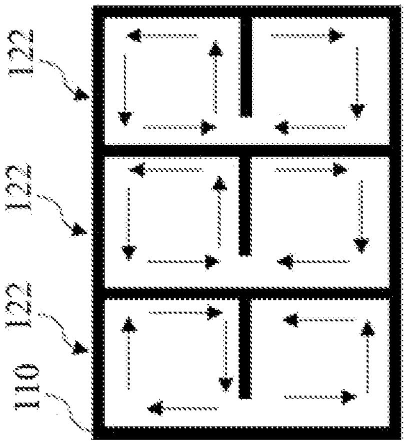
Figure 10:
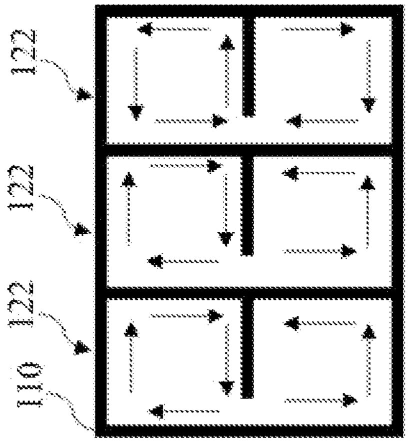
Figure 11:
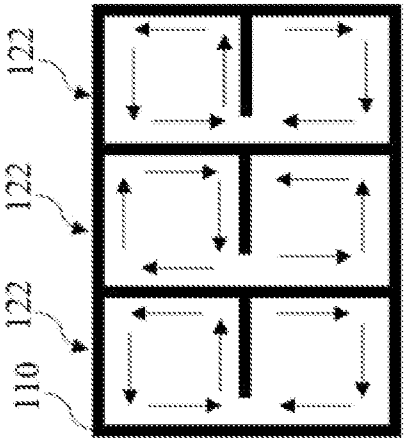
Figure 12:
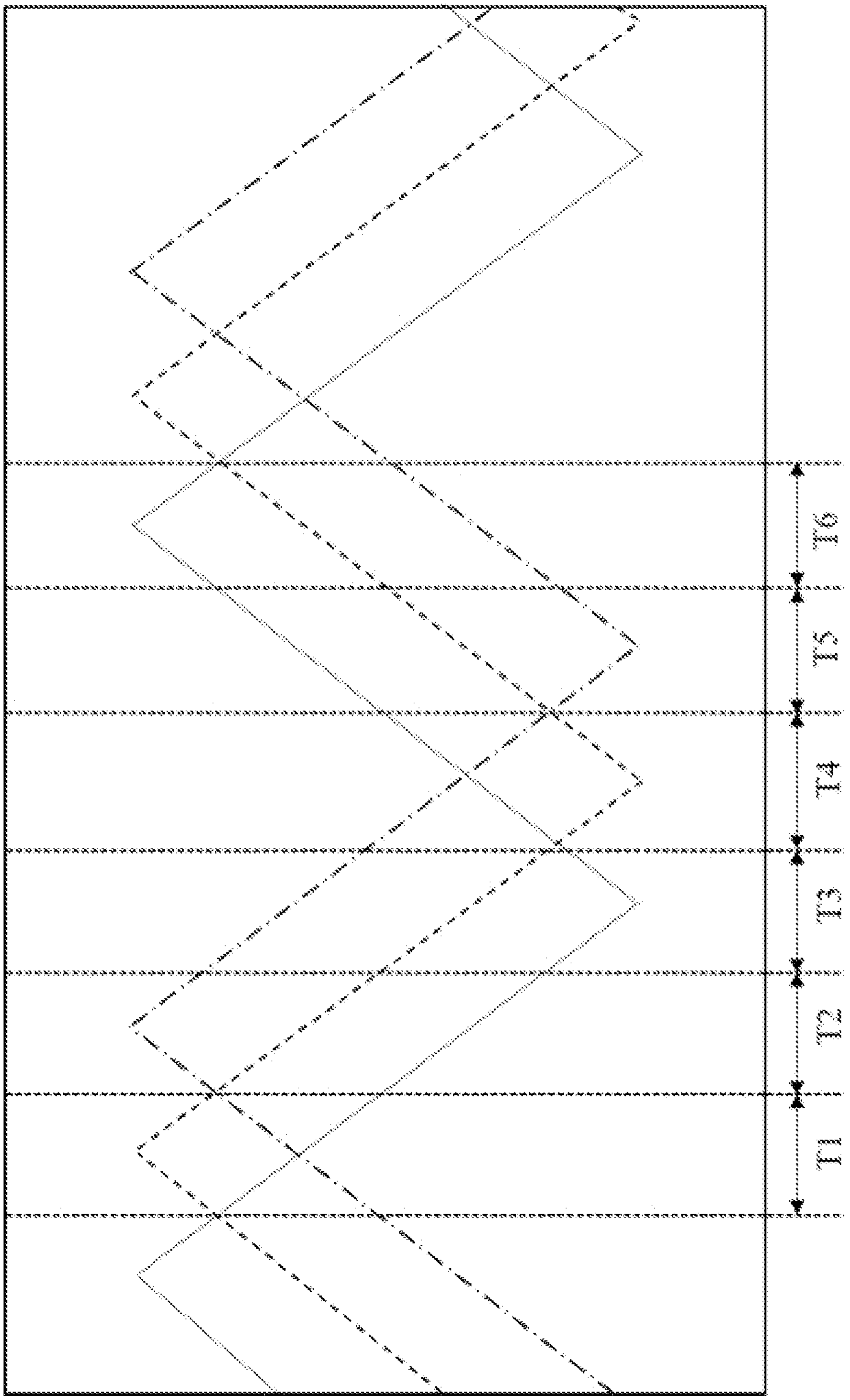
FIG. 12 is a waveform diagram of excitation current of the three magnetic elements of FIG. 1 according to another embodiment.
Figure 13:
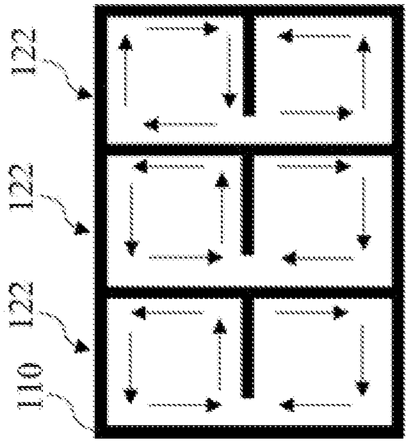
FIG. 13 to FIG. 18 are schematic diagrams of magnetomotive force distributions of the three magnetic elements of FIG. 1 in the first time period to the sixth time period of FIG. 11, respectively.
Figure 14:
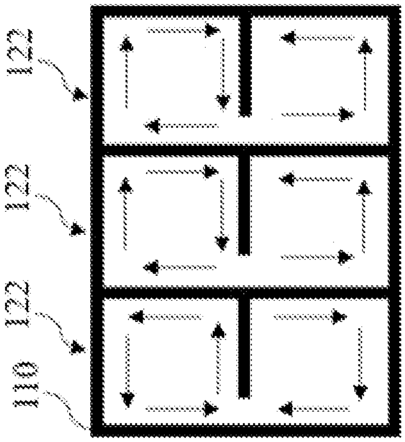
Figure 15:
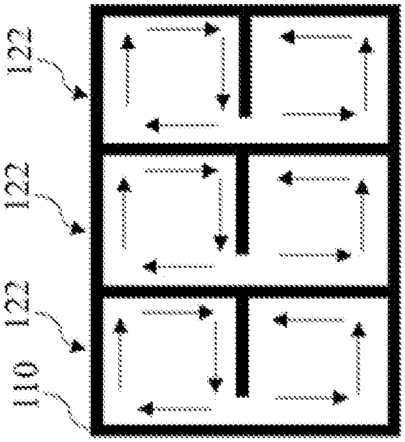
Figure 16:
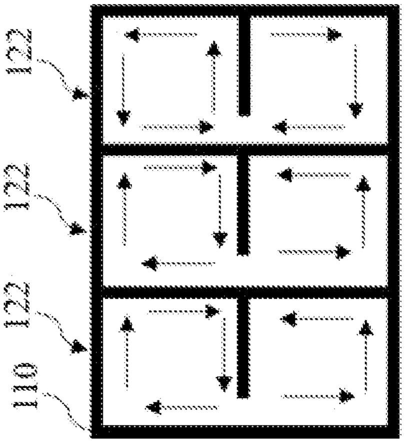
Figure 17:
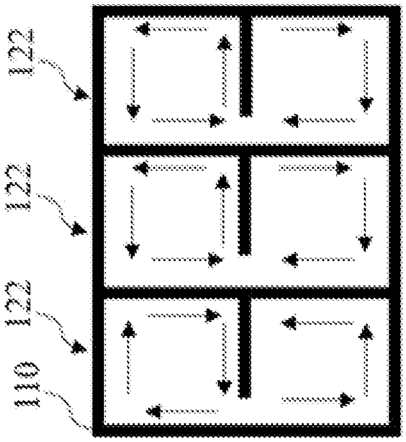
Figure 18:
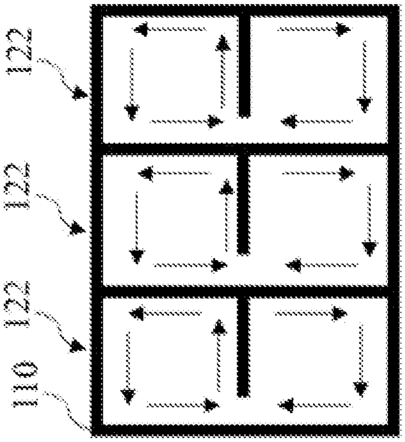

Please refer to FIG. 5 to FIG. 11 and FIG. 12 to FIG. 18, wherein FIG. 5 is a waveform diagram of excitation currents of the three magnetic elements of FIG. 1 according to an embodiment, FIG. 6 to FIG. 11 are schematic diagrams of magnetomotive force distributions of the three magnetic elements of FIG. 1 in the first time period to the sixth time period of FIG. 5, respectively, FIG. 12 is a waveform diagram of excitation current of the three magnetic elements of FIG. 1 according to another embodiment, and FIG. 13 to FIG. 18 are schematic diagrams of magnetomotive force distributions of the three magnetic elements of FIG. 1 in the first time period to the sixth time period of FIG. 11, respectively. In FIG. 5 and FIG. 12, the first time period T1 to the sixth time period T6 constitute one switching cycle of the three-phase LLC conversion circuit using the three magnetic elements 120, the solid line is the waveform of the excitation current of the leftmost magnetic element 120, the dotted line is the waveform of the excitation current of the magnetic element 120 in the middle position, and the chain line is the waveform of the excitation current of the rightmost magnetic element 120, the horizontal axis represents time, and the vertical axis represents the magnitude of the current. In FIG. 6 to FIG. 11 and FIG. 13 to FIG. 18, directions of the arrows represent the directions of the magnetomotive force of magnetic core regions of the three first magnetic cores 122.

As shown in FIG. 5 to FIG. 11, since there are three magnetic elements 120 in the magnetic integrated device 100, the excitation currents of the three magnetic elements 120 have phases different from each other by 120 degrees, and the excitation directions of the three magnetic elements 120 are all the same, the magnetomotive force of the first magnetic core body 1222 of the leftmost magnetic element 120 and the magnetomotive force of the first magnetic core body 1222 of the magnetic element 120 in the middle position are enhanced in the third time period T3 and the sixth time period T6, thereby increasing the magnetic core loss.

As shown in FIG. 12 to FIG. 18, the excitation currents of the three magnetic elements 120 have phases different from each other by 120 degrees, but the excitation direction of the magnetic element 120 in the middle position in FIG. 5 is reversed (that is, the excitation directions of adjacent magnetic elements 120 among the three magnetic elements 120 are opposite). Therefore, the enhancement of the magnetomotive force of the first magnetic core body 1222 of the leftmost magnetic element 120 and the magnetomotive force of the first magnetic core body 1222 of the magnetic element 120 in the middle position in the third time period T3 and the sixth time period T6 is eliminated, and in other time periods (i.e., the first time period T1, the second time period T2, the fourth time period T4 and the fifth time period T5), there is no magnetic core region with enhanced magnetomotive force. That is to say, under the premise of only changing the current direction of the excitation current of the magnetic element 120 in the middle position (i.e., without adding any cost), the effect of magnetic cancellation can be achieved and the core loss can be reduced. When the magnetic integrated device 100 is applied to the three-phase LLC conversion circuit, the efficiency of the three-phase LLC conversion circuit can be improved.

In one embodiment, please refer to FIG. 4, in each magnetic element 120, the first magnetic core body 1222 is provided with two open slots 70 symmetrical to each other, and the two open slots 70 are respectively located between the two first side columns 1226, so that the material of the first magnetic core body 1222 can be saved, and the assembly and heat dissipation of the combined winding 124 are facilitated. The openings of the two open slots 70 are arranged outward, and the shapes of the two open slots 70 can be adjusted according to actual needs.

In one embodiment, each magnetic element 120 comprises a plurality of the secondary windings 1242 and a plurality of the primary windings 1244 respectively, and in each of the magnetic elements 120, the plurality of the secondary windings 1242 and the plurality of the primary windings 1244 are alternately arranged along the extension direction E of the first magnetic column 1224. For example, in each magnetic element 120, there are four secondary windings 1242 and three primary windings 1244, and one primary winding 1244 is disposed between two adjacent secondary windings 1242, as shown in FIG. 1 and FIG. 3. The number of secondary windings 1242 and the number of primary windings 1244 in each magnetic element 120 can be adjusted according to actual needs. In the magnetic element 120, the plurality of primary windings 1244 can be formed by the same winding, and the plurality of secondary windings 1242 can be independent components, so that the plurality of secondary windings 1242 and the plurality of primary windings 1244 are arranged alternately along the extension direction E to realize the flexible adjustment of the secondary side voltage of the magnetic element 120. It should be noted that the primary winding 1244 and the secondary winding 1242 may be windings composed of Litz wires, or the primary winding 1244 and the secondary winding 1242 may be arranged on a printed circuit board (PCB). In addition, the number of the primary winding 1244 and the number of the secondary winding 1242 are not limited; that is, there are one or more primary windings 1244 and one or more secondary windings 1242 in the magnetic element 120, and the number of the primary winding 1244 and the number of the secondary winding 1242 can be the same or different in the magnetic element 120.

In one embodiment, please refer to FIG. 4, the first accommodating slot 50 of each magnetic element 120 may have a first opening 80 arranged along a first direction F and a second opening 90 arranged along a second direction S, wherein the first direction F is parallel to the second direction S (i.e., the first opening 80 communicates with the second opening 90). The opening direction of the first opening 80 and the opening direction of one of the two open slots 70 are towards the first direction F, and the opening direction of the second opening 90 and the opening direction of the other of the two open slots 70 are towards second direction S. In addition, in each magnetic element 120, the secondary winding 1242 comprises a first secondary pin 91 and a second secondary pin 92, wherein the first secondary pin 91 and the second secondary pin 92 are exposed from the first opening 80 when the secondary winding 1242 is disposed in the first accommodating slot 50; the length of the first secondary pin 91 can be greater than the length of the second secondary pin 92, so that the first secondary pin 91 can be used for plugging into an external circuit board (not shown), and the second secondary pin 92 can be used for positioning, as will be described later. Besides, when the combined winding 124 comprises a plurality of secondary windings 1242 arranged alternately along the extension direction E, in the odd-numbered secondary winding 1242, the second secondary pin 92 can be located on the left side of the first secondary pin 91; in the even-numbered secondary winding 1242, the second secondary pin 92 can be located on the right side of the first secondary pin 91 (that is, the configuration locations of the second secondary pins 92 of adjacent secondary windings 1242 can be staggered), and the first secondary pins 91 of the plurality of secondary windings 1242 are arranged in fixed configuration locations.

In one embodiment, in each magnetic element 120, the secondary winding 1242 may comprises at least one conductive plate (e.g., a copper sheet), and the primary winding 1244 is a coil. When the combined winding 124 comprises a plurality of secondary windings 1242 and a plurality of primary windings 1244, which are arranged alternately along the extension direction E, the plurality of primary windings 1244 may be formed by the same winding.

In one embodiment, please refer to FIG. 1 and FIG. 3, each magnetic element 120 may further comprises a spacer 126 sleeved on the first magnetic column 1224, wherein one side of the spacer 126 of the leftmost magnetic element 120 is connected to the combined winding 124 of the leftmost magnetic element 120, and the other side of the spacer 126 of the leftmost magnetic element 120 is connected to the first magnetic core plate 110; the spacer 126 of the magnetic element 120 in the middle position is connected to the combined winding 124 of the magnetic element 120 in the middle position, and the other side of the spacer 126 of the magnetic element 120 in the middle position is connected to the first magnetic core body 1222 of the leftmost magnetic element 120; one side of the spacer 126 of the rightmost magnetic element 120 is connected to the combined winding 124 of the rightmost magnetic element 120, and the other side of the spacer 126 of the rightmost magnetic element 120 is connected to the first magnetic core body 1222 of the magnetic element 120 in the middle position. That is, one side of the spacer 126 of the magnetic element 120 is connected to the composite winding 124 of the magnetic element 120, and the other side of the magnetic element 120 is connected to the first magnetic core plate 110 or the first magnetic core body 1222 of the adjacent magnetic element 120. The spacer 126 is made of non-magnetic insulating material. Through the design of the spacer 126 of each magnetic element 120, the combined winding 124 of the magnetic element 120 is far away from the air gap 10 formed by the first magnetic column 1224, the spacer 126 and the first magnetic core plate 110 or the first magnetic core body 1222 of the adjacent magnetic element 120, thereby reducing the eddy current loss of the combined winding 124 caused by the magnetic leakage. When the magnetic integrated device 100 is applied to a three-phase LLC conversion circuit, the efficiency of the three-phase LLC conversion circuit can be improved.

In one embodiment, please refer to FIG. 3, the thickness D1 of the spacer 126 along the extension direction E of the first magnetic column 1224 is four times the depth D2 of the air gap 10 along the extension direction E of the first magnetic column 1224. It should be noted that, in actual application, the magnitude of the thickness D1 can be three times to five times the magnitude of the depth D2 according to the requirements. In addition, in order to express the relationship between the thickness D1 and the depth D2 clearly, the spacer 126, the air gap 10 and the combined winding 124 in FIG. 3 are not drawn in actual scale.

Figure 19:
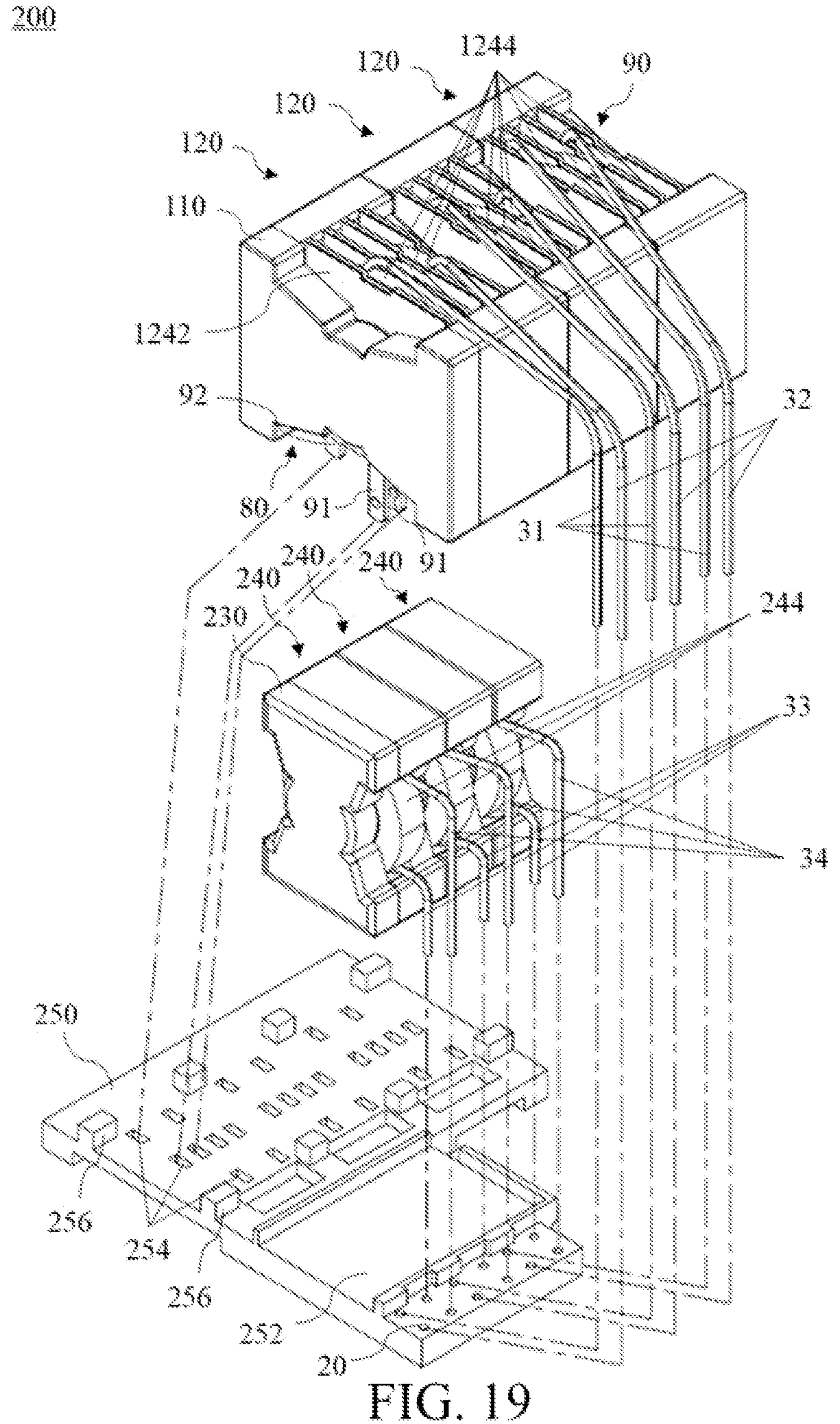
FIG. 19 is an exploded schematic diagram of a magnetic integrated device according to another embodiment of the present disclosure.
Figure 20:
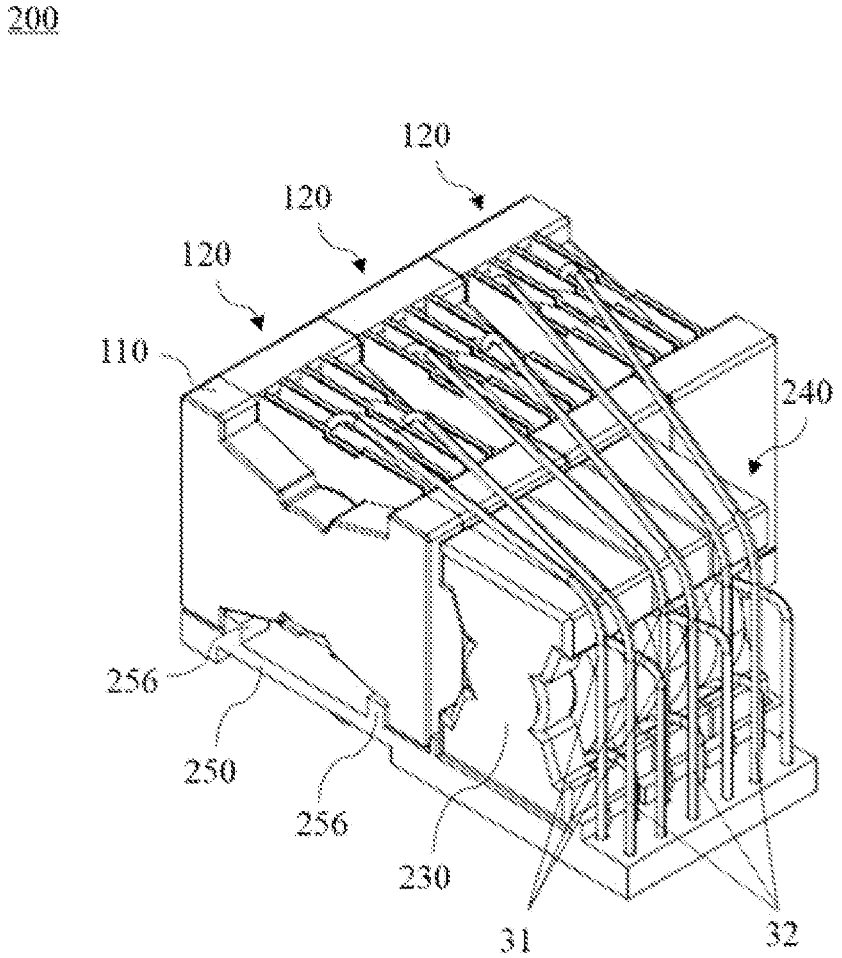
FIG. 20 is a combination diagram of the magnetic integrated device of FIG. 19.

Please refer to FIG. 19 and FIG. 20, wherein FIG. 19 is an exploded schematic diagram of a magnetic integrated device according to another embodiment of the present disclosure, and FIG. 20 is a combination diagram of the magnetic integrated device of FIG. 19. In addition to the first magnetic core plate 110 and the three magnetic elements 120, the magnetic integrated device 200 may further comprise a second magnetic core plate 230, three inductance elements 240 and a base 250, wherein the second magnetic core plate 230 and the three inductance elements 240 can be integrated into a three-phase integrated resonant inductor. It should be noted that the number of the magnetic elements 120 and the number of the inductance elements 240 are the same.

Figure 21:
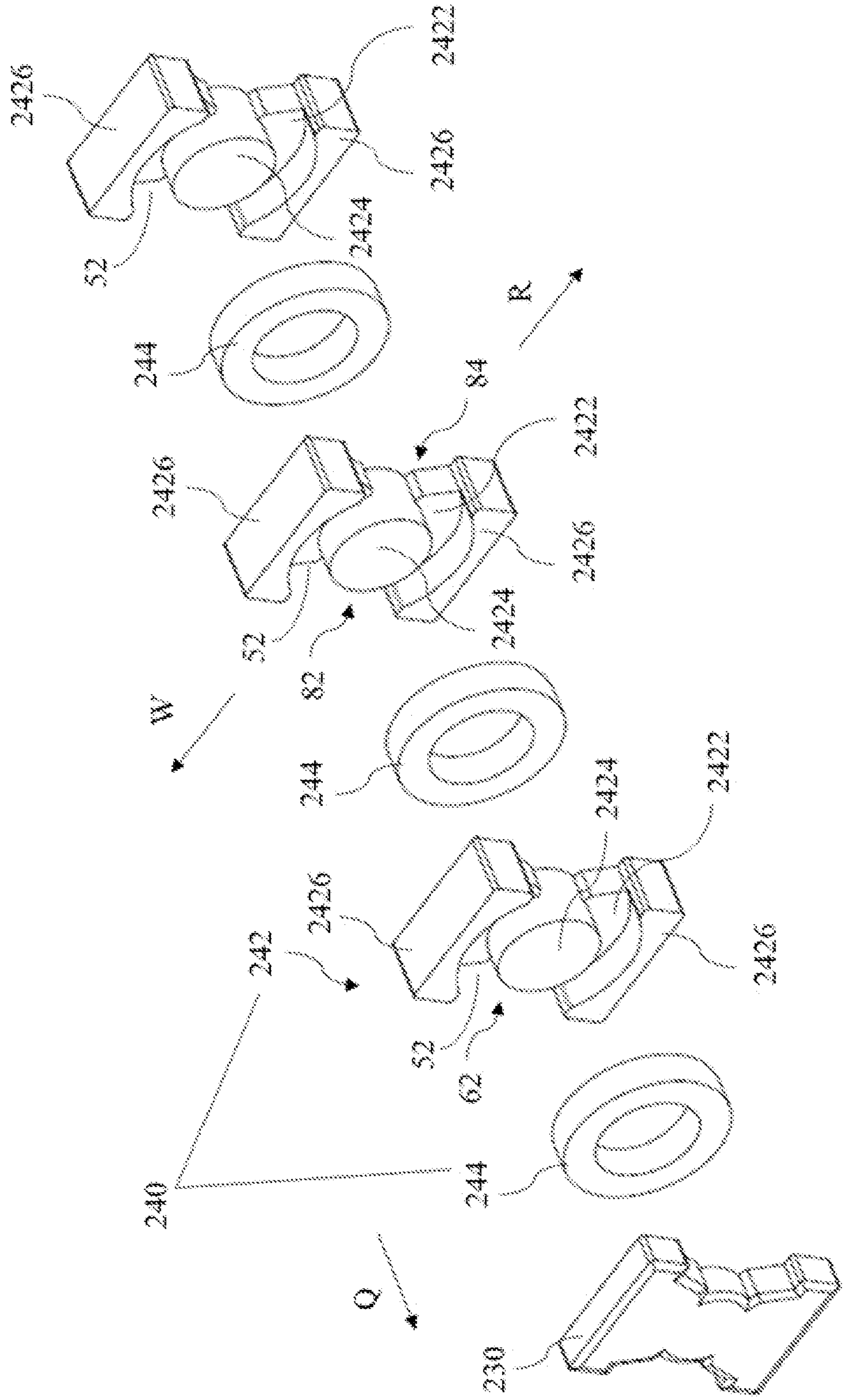
FIG. 21 is an exploded schematic diagram of the three-phase resonant inductor of FIG. 19.

Please refer to FIG. 19 and FIG. 21, wherein FIG. 21 is an exploded schematic diagram of the three-phase resonant inductor of FIG. 19. The three inductance elements 240 are arranged in sequence in the same direction, and one of the three inductance elements 240 (i.e., the leftmost inductance element 240 in the drawings of FIG. 19 and FIG. 21) is connected to the second magnetic core plate 230. Each inductance element 240 comprises a second magnetic core 242 and an inductor winding 244, wherein the second magnetic core 242 comprises a second magnetic core body 2422, a second magnetic column 2424, and two second side columns 2426, the second magnetic column 2424 and the two second side columns 2426 are fixed on the same side of the second magnetic core body 2422, the two second side columns 2426 are disposed at opposite sides of the second magnetic core body 2422, the outer wall of the second magnetic column 2424 and the inner walls of the two second side columns 2426 form a second accommodating slot 52, and an extension direction Q of the second magnetic column 2424 is towards the second magnetic core plate 230; the inductor winding 244 is disposed in the second accommodating slot 52 and wound around the second magnetic column 2424.

Besides, the second magnetic core 242 is provided with a magnetic core opening 62 facing the extension direction Q. The height of each of the two second side columns 2426 along the extension direction Q is greater than the heights of the second magnetic columns 2424 along the extension direction Q. Therefore, when the three inductance elements 240 are arranged in sequence in the same direction, the magnetic core openings 62 of the three inductance elements 240 face the same direction, the leftmost inductance element 240 is connected to the second magnetic core plate 230 through the two second side columns 2426 thereof, and each of the other inductance elements 240 (i.e., the inductance element 240 in the middle position and the inductance element 240 on the far right) is connected to the second magnetic core body 2422 of the adjacent inductance element 240 through two second side columns 2426 thereof.

In addition, the shape of the second magnetic core plate 230 may correspond to the shape of the second magnetic core body 2422; that is, the difference between the second magnetic core plate 230 and the second magnetic core 242 may be that the second magnetic core plate 230 does not have the second magnetic column 2424 and the two second side columns 2426.

Furthermore, the excitation currents of the three inductance elements 240 have phases different from each other by 120 degrees, and the excitation directions of the adjacent inductance elements 240 among the three inductance elements 240 are opposite. Since the excitation directions of the adjacent magnetic elements 120 among the three magnetic elements 120 are opposite, the effect of magnetic cancellation can be achieved. Similarly, the excitation directions of the adjacent inductance elements 240 among the three inductance elements 240 are opposite, so the effect of magnetic cancellation can be also achieved, and the detailed description is not repeated here. When the magnetic integrated device 200 is applied to a three-phase LLC conversion circuit, the efficiency of the three-phase LLC conversion circuit can be improved.

Please refer to FIG. 19 and FIG. 20, the base 250 is configured to carry the three-phase integrated transformer formed by the first magnetic core plate 110 and the three magnetic elements 120 and the three-phase integrated resonant inductor formed by the second magnetic core plate 230 and the three inductance elements 240. The three-phase integrated transformer and the three-phase integrated resonant inductor can be applied to a three-phase LLC conversion circuit, and each phase of the three-phase LLC conversion circuit is in interleaved parallel. Therefore, the three-phase integrated transformer and the three-phase integrated resonant inductor can be integrated together to facilitate the installation of the magnetic integrated device 200. It should be noted that the base 250 is only configured to carry the three-phase integrated transformer and the three-phase integrated resonant inductor. Therefore, the three-phase integrated transformer and the three-phase integrated resonant inductor can be fixed on base 250 by the glue.

Please refer to FIG. 19 and FIG. 20, the primary winding 1244 of each magnetic element 120 is a first coil, the inductor winding 244 of each inductance element 240 is a second coil. When there are three magnetic elements 120 and three inductance elements 240 in the magnetic integrated device 200 (i.e., N is equal to 3), there are twelve through holes 20 on the base 25, and the twelve through holes 20 are configured to pass through the lead wires 31 and 32 of each first coil and the lead wires 33 and 34 of each second coil. In this embodiment, the primary winding 1244 of the magnetic element 120 and the inductor winding 244 of the inductance element 240 corresponding thereto can be electrically connected in the external circuit environment. A total of twelve lead wires for connecting to the main circuit of the three-phase LLC converter are in three primary windings 1244 of the three-phase integrated transformer and three inductor winding 244 of the three-phase integrated resonant inductor. The number of lead wires is too large, so it is easy for the lead wires to bend, the occupied space is large, and it is not conducive to improving the power density of the three-phase LLC conversion circuit when the magnetic integrated device 200 is applied to the three-phase LLC conversion circuit.

Figure 22:
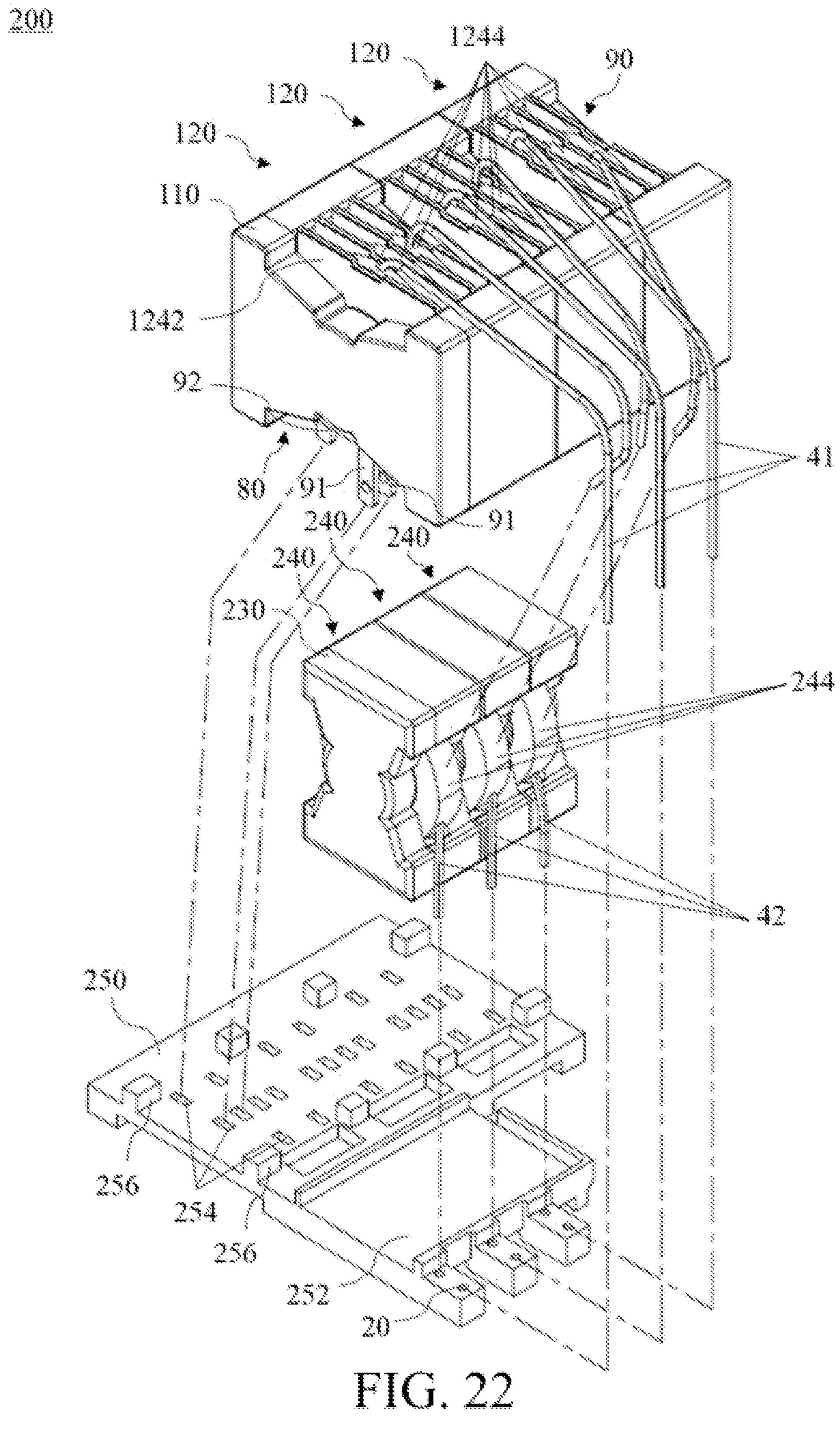
FIG. 22 is an exploded schematic diagram of a magnetic integrated device according to yet another embodiment of the present disclosure.
Figure 23:
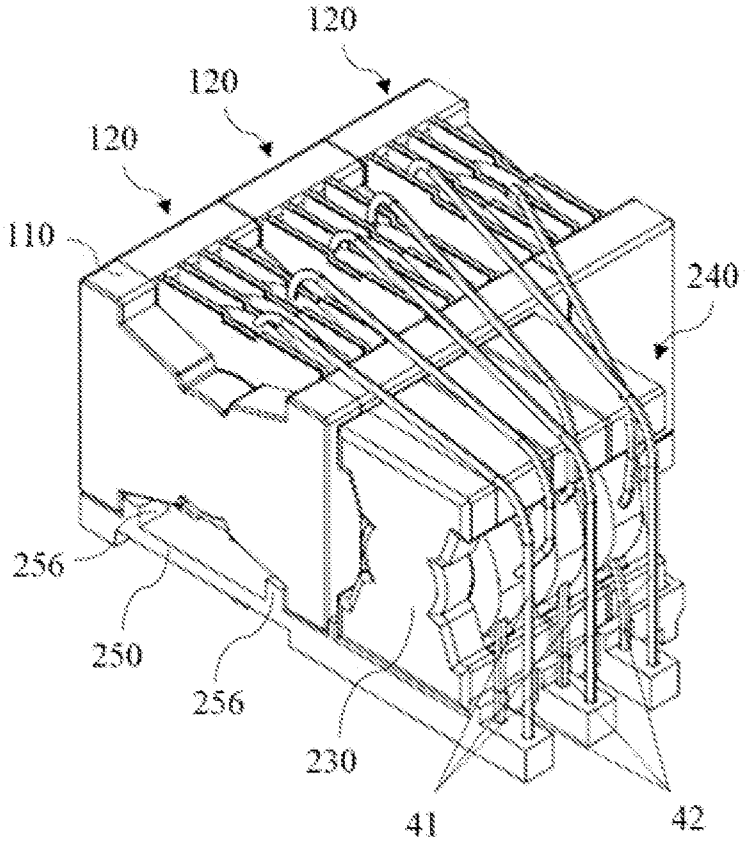
FIG. 23 is a combination diagram of the magnetic integrated device of FIG. 22.

Therefore, in the embodiments of FIG. 22 and FIG. 23, the primary winding 1244 of the magnetic element 120 and the inductor winding 244 of the inductance element 240 corresponding thereto are electrically connected through the same winding. Specifically, please refer to FIG. 22 and FIG. 23, wherein FIG. 22 is an exploded schematic diagram of a magnetic integrated device according to yet another embodiment of the present disclosure, and FIG. 23 is a combination diagram of the magnetic integrated device of FIG. 22. In this embodiment, one primary winding 1244 and one inductor winding 244 in each phase of the three-phase LLC conversion circuit are formed by the same winding, there are six through holes 20 on the base 250, and the six through holes 20 are configured to pass through lead wire 41 and lead wire 42 of each winding forming the one primary winding 1244 and the one inductor winding 244. That is to say, a total of six lead wires for connecting to the main circuit of the three-phase LLC converter are in three primary windings 1244 of the three-phase integrated transformer and three inductor winding 244 of the three-phase integrated resonant inductor, so the configuration locations of six lead wires are saved, the occupied space is reduced, and the power density of the three-phase LLC conversion circuit can be improved when the magnetic integrated device 200 is applied to the three-phase LLC conversion circuit. It should be noted that the sharing of the same winding can also be achieved by soldering the lead wire 32 to the lead wire 34 in FIG. 19 and FIG. 20.

In some embodiments, please refer to FIG. 4, FIG. 19, FIG. 21 and FIG. 22, the first accommodating slot 50 of each magnetic element 120 may have a first opening 80 arranged along a first direction F and a second opening 90 arranged along a second direction S, wherein the first direction F is parallel to the second direction S; the second accommodating slot 52 of each inductance element 240 may have a third opening 82 arranged along a third direction W and a fourth opening 84 arranged along a fourth direction R, wherein the third direction W is parallel to the fourth direction R, and the first direction F is perpendicular to the third direction W. In FIG. 22, through the design of the first opening 80, the second opening 90, the third opening 82 and the fourth opening 84, it is beneficial to implement that the primary winding 1244 of the magnetic element 120 and the inductor winding 244 of the inductance element 240 corresponding thereto are formed by the same winding.

In some embodiments, please refer to FIG. 1, and FIG. 19 to FIG. 23, the base 250 may comprises a positioning slot 252, a plurality of positioning holes 254 and a plurality of positioning blocks 256; the positioning slot 252 may be configured to locate the three-phase integrated resonant inductor, the plurality of positioning holes 254 and the plurality of positioning blocks 256 can be configured to locate the three-phase integrated transformer, wherein the plurality of positioning blocks 256 can be configured to abut against first magnetic core body 1222 of the first magnetic core 122 of each magnetic element 120, the plurality of positioning holes 254 can be configured to accommodate the first secondary pin 91 and the second secondary pin 92 of the secondary winding 1242 of each magnetic element 120. In addition, since the length of the first secondary pin 91 can be greater than the length of the second secondary pin 92, the first secondary pin 91 of the secondary winding 1242 of each magnetic element 120 can pass through the corresponding positioning hole 254 for plugging into an external circuit board (not drawn).

In summary, in the embodiments of the present disclosure, by integrating the first magnetic core plate and N magnetic elements into an N-phase integrated transformer, the volume of the N-phase integrated transformer is reduced, and the manufacturing cost of the N-phase integrated transformer is reduced. When the N-phase integrated transformer is applied to an N-phase LLC conversion circuit, the power density of the N-phase LLC conversion circuit can be improved, and the configuration space of the N-phase LLC conversion circuit on the circuit board can be reduced. In addition, since the excitation currents of the N magnetic elements have phases different from each other by $$\frac{360}{N}$$

degrees, and the excitation directions of adjacent magnetic elements among the N magnetic elements are opposite, the effect of magnetic cancellation can be achieved, the power loss of the first magnetic core can be reduced, and the efficiency of the N-phase LLC conversion circuit can be improved when the N-phase integrated transformer is applied to the N-phase LLC conversion circuit.

Besides, through the design of the space of each magnetic element, the combined winding of the magnetic element is far away from the air gap, so the eddy current loss of the combined winding caused by the magnetic leakage is reduced, and the efficiency of the N-phase LLC conversion circuit can be improved when the magnetic integrated device is applied to the N-phase LLC conversion circuit. Furthermore, the N-phase integrated transformer and the N-phase integrated resonant inductor can be put together using the same base, which facilitates the production of the N-phase LLC conversion circuit. Moreover, the power density of the N-phase LLC conversion circuit can be improved by saving the configuration positions of the lead wires and reducing the occupied space.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A magnetic integrated device, comprising:

a first magnetic core plate; and

N magnetic elements arranged in sequence in the same direction, wherein one of the N magnetic elements is connected to the first magnetic core plate, excitation currents of the N magnetic elements have phases different from each other by $$\frac{360}{N}$$

degrees, and excitation directions of adjacent magnetic elements among the N magnetic elements are opposite, N is an integer greater than or equal to 2, and each magnetic element comprises:

a first magnetic core comprising a first magnetic core body, a first magnetic column and two first side columns, wherein the first magnetic column and the two first side columns are fixed on the same side of the first magnetic core body, the two first side columns are disposed at opposite sides of the first magnetic core body, an outer wall of the first magnetic column and inner walls of the two first side columns form a first accommodating slot, and an extension direction of the first magnetic column is towards the first magnetic core plate; and a combined winding comprising a secondary winding and a primary winding, wherein the secondary winding and the primary winding are disposed in the first accommodating slot and wound around the first magnetic column.

2. The magnetic integrated device according to claim 1, wherein, in each magnetic element, the first magnetic core body is provided with two open slots symmetrical to each other, and the two open slots are respectively located between the two first side columns.

3. The magnetic integrated device according to claim 1, wherein each magnetic element comprises a plurality of the secondary windings and a plurality of the primary windings respectively, and in each of the magnetic elements, the plurality of the secondary windings and the plurality of the primary windings are alternately arranged along the extension direction of the first magnetic column.

4. The magnetic integrated device according to claim 1, wherein each magnetic element further comprises a spacer sleeved on the first magnetic column, wherein one side of the spacer is connected to the combined winding, and the other side of the spacer is connected to the first magnetic core plate or the first magnetic core body of adjacent magnetic element.

5. The magnetic integrated device according to claim 4, wherein in each magnetic element, the first magnetic column, the spacer and the first magnetic core body connecting to the first magnetic core plate or the adjacent magnetic element forms an air gap, and a thickness of the spacer along the extension direction of the first magnetic column is three times to five times a depth of the air gap along the extension direction of the first magnetic column.

6. The magnetic integrated device according to claim 1, further comprising:

a second magnetic core plate;

N inductance elements arranged in sequence in the same direction, wherein one of the N inductance elements is connected to the second magnetic core plate, excitation currents of the N inductance elements have phases different from each other by $$\frac{360}{N}$$

degrees, and excitation directions of adjacent inductance elements among the N inductance elements are opposite, and each inductance element comprises:

a second magnetic core comprising a second magnetic core body, a second magnetic column and two second side columns, wherein the second magnetic column and the two second side columns are fixed on the same side of the second magnetic core body, the two second side columns are disposed at opposite sides of the second magnetic core body, outer wall of the second magnetic column and inner walls of the two second side columns form a second accommodating slot, and an extension direction of the second magnetic column is towards the second magnetic core plate; and an inductor winding disposed in the second accommodating slot and wound around the second magnetic column; and a base configured to carry an N-phase integrated transformer formed by the first magnetic core plate and the N magnetic elements, and an N-phase integrated resonant inductor formed by the second magnetic core plate and the N inductance elements.

7. The magnetic integrated device according to claim 6, wherein the primary winding of each magnetic element is a first coil, and the inductor winding of each inductance element is a second coil; when N is equal to 3, there are twelve through holes on the base, and the twelve through holes are configured to pass through two lead wires of each first coil and each second coil.

8. The magnetic integrated device according to claim 6, wherein one primary winding and one inductor winding are formed by the same winding; when Nis equal to 3, there are six through holes on the base, and the six through holes are configured to pass through two lead wires of each winding forming the one primary winding and the one inductor winding.

9. The magnetic integrated device according to claim 6, wherein the first accommodating slot of each magnetic element has a first opening arranged along a first direction and a second opening arranged along a second direction, the second accommodating slot of each inductance element has a third opening arranged along a third direction and a fourth opening arranged along a fourth direction in each inductance element, the first direction is parallel to the second direction, the third direction is parallel to the fourth direction, and the first direction is perpendicular to the third direction.

10. The magnetic integrated device according to claim 9, wherein, in each magnetic element, the secondary winding comprises a first secondary pin and a second secondary pin, and the first secondary pin and the second secondary pin are exposed from the first opening when the secondary winding is disposed in the first accommodating slot.

11. The magnetic integrated device according to claim 10, wherein in each magnetic element, the secondary winding comprises at least one conductive plate, and the primary winding is a coil.

12. The magnetic integrated device according to claim 10, wherein the base comprises:

a positioning slot configured to locate the N-phase integrated resonant inductor; and a plurality of positioning holes and a plurality of positioning blocks configured to locate the N-phase integrated transformer, wherein the plurality of positioning blocks are configured to abut against the first magnetic core body of the first magnetic core of each magnetic element, and the plurality of positioning holes are configured to accommodate the first secondary pin and the second secondary pin of the secondary winding of each magnetic element.

13. The magnetic integrated device according to claim 12, wherein the first secondary pin of the secondary winding of each magnetic element passes through a positioning hole corresponding thereto, to be plugged into an external circuit board.

* * * * *